Patented Apr. 7, 1936

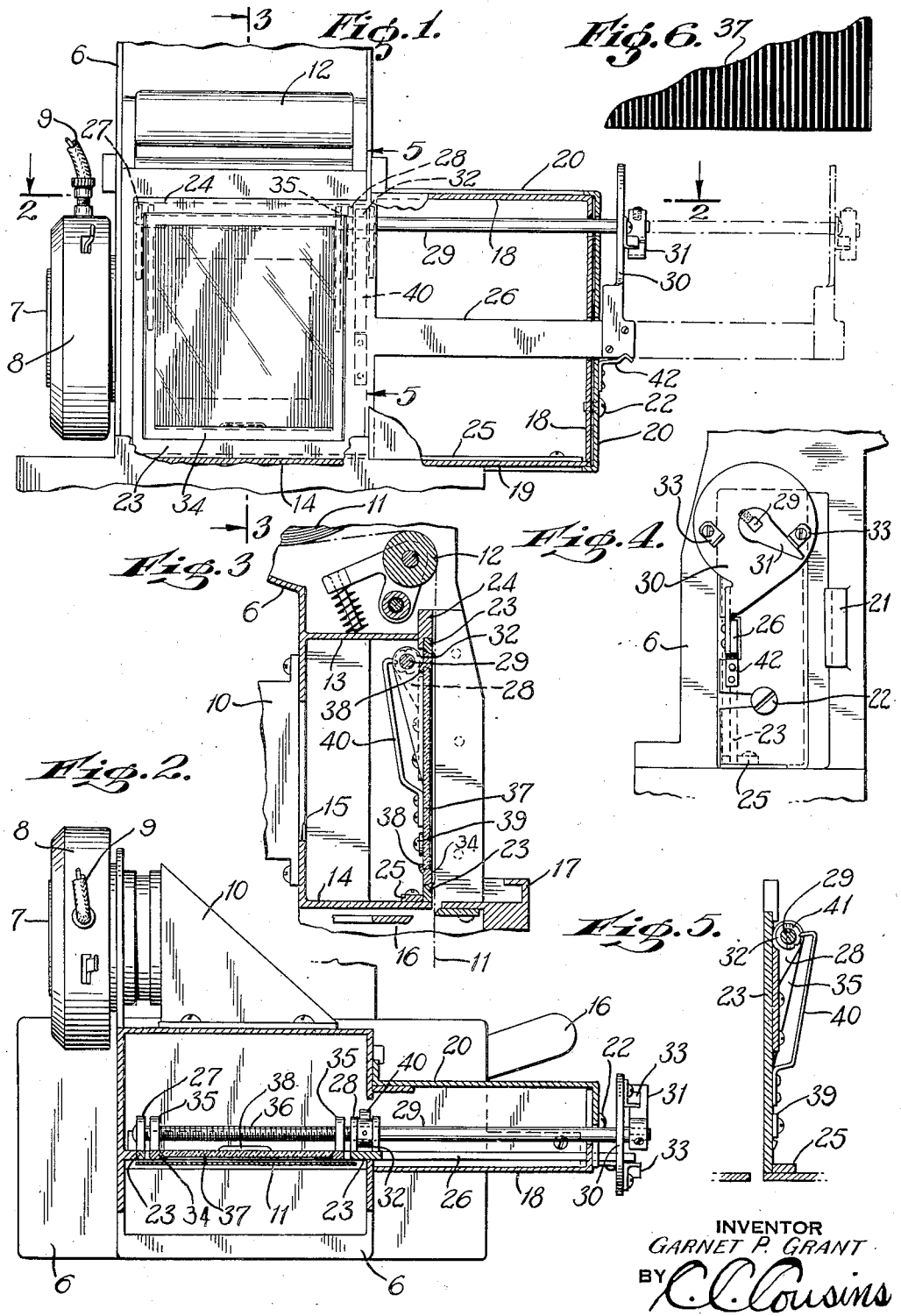

2,036,211

UNITED STATES PATENT OFFICE 2,036,211

ADUSTABLE SCREEN HOLDER FOR CAMERAS

Garnet P. Grant, New York, N. Y.

Application November 15, 1933, Serial No. 698,053
Renewed October 9, 1935

3 Claims. (Cl. 95—36)

This invention relates to cameras and particularly to an adjustable screen holder for cameras.

In photography it is well known to produce a picture by making an exposure through a screen having a series of vertical opaque lines or bars. The film or screen is then moved so that the opaque lines cover the exposed areas of the film and a second exposure is made on those areas of the film previously covered by the opaque lines. When developed, this produces a composite picture of the two exposures. The picture is then mounted behind a viewing screen having opaque lines similar to the screen in the camera and a picture showing one exposure is visible. By moving the screen or the picture slightly the picture first on view is covered by the opaque lines and the other picture is visible.

The opaque lines or bars on the screen are usually narrow, being only from .005 to .010 of an inch in width with correspondingly narrow transparent areas between the lines. Accordingly, it is necessary to provide a positive fine adjustment of the film or screen so that upon changing the position of the film or screen the opaque lines will register exactly with the previously exposed areas on the film. Therefore, one object of this invention is to provide a screen holder for the purpose described, and simple means to move the screen a predetermined distance to secure exact register of the screen and the film.

The finished pictures, as seen through the viewing screen, are relatively dark by reason of the fact that at least 50% of the picture is obscured by the opaque lines of the viewing screen. Therefore, in making such pictures, it is necessary to use a camera having a good quality lens if the finished picture is to have sharpness and quality. The pictures so produced are usually made or sold as novelties. By reason of the cost involved it is not practical, as a commercial proposition, to have a camera adapted solely to produce such composite pictures. Therefore, the specific object of this invention is to provide a screen holder and a screen which may be adjustably interposed between the film and lens in a camera and which may be readily removed from between the film and lens so that the camera may be used to take ordinary photographs in the usual manner as well as such composite pictures.

A further object of the invention is to provide a simple and inexpensive mechanism which may be applied to ordinary cameras so that an ordinary camera may be used to selectively take composite or ordinary pictures.

The invention consists of the construction, combination and arrangement of parts, as herein illustrated, described and claimed.

In the accompanying drawing, forming part hereof, is illustrated one embodiment of the invention, in which drawing similar reference characters designate corresponding parts, and in which:

Figure 1 is a side elevation of a camera, partly in section, the top and bottom of the camera being broken away;

Figure 2 is a horizontal section on line 2—2 of Figure 1, looking downward;

Figure 3 is a vertical section on line 3—3 of Figure 1, looking in the direction indicated by the arrows;

Figure 4 is a fragmentary detail in rear elevation of the parts shown on the right-hand side of Figure 1; and, Figure 5 is a fragmentary detail in vertical section taken approximately on line 5—5 of Figure 1, looking in the direction indicated by the arrows.

Figure 6 is an enlarged fragmentary detail showing a portion of the screen.

Referring to the drawing, 6 designates a camera having the usual lens 7, a shutter 8 and a shutter release 9. Behind the lens 7 is disposed a reflecting prism 10 adapted to throw the image on the film 11. The film 11 may be either ordinary film or it may be direct positive paper adapted to be developed either as a negative or a positive print.

The film 11 may be carried on a roll in the upper portion of the camera 6, and fed over a roller 12 so as to move downward in a vertical line. The camera 6 adjacent the prism 10 is provided with an upper horizontal wall 13 and a lower horizontal wall 14, between which walls there is provided an opening 15 adjacent the inner surface of the prism 10. Below the wall 14 is disposed a pivoted knife 16 so that when a section of film 11 has been exposed the film may be moved downward and the exposed portion cut off from the roll. The roll of film and the back of the camera 6 are covered by a removable cover, not shown, the lower end of which is secured to a bracket 17.

Secured to one side of the camera 6 opposite the lens 7 is a substantially rectangular housing 18 having its bottom 19 in horizontal alignment with the wall 14 of the camera 6. The housing 18 is closed by a cover 20 secured by a clip 21 on the camera 6 and a stud 22 on the housing 18.

Disposed in the housing 18 is a rectangular frame 23 slidable on the bottom 19. The wall of the camera 6 adjacent the housing 18 is removed so that the frame 23 may be slid into the camera 6 on the horizontal wall 14. The top edge of the frame 23 operates in a guideway 24 secured to the wall 13 of the camera 6, which guideway 24 extends to the end of the housing 18. Disposed on the horizontal walls 14 and 19 of the camera 6 and the housing 18 is a strip 25 which acts as a guide for the lower edge of the frame 23.

Carried by one side of the frame 23 is an extension or operating arm 26 which projects through and extends past the housing 18. By manual movement of the extension 26 the frame 23 may be readily moved from within the camera 6 to the housing 18 so as to remove the frame 23 from between the prism 10 and the film 11. The frame 23 is prevented from movement toward the prism 10 by means of the guides 24 and 25, and prevented from movement in the opposite direction by reason of the frame 23 and extension 26 bearing against one wall of the housing 18. Carried by the frame 23 on one edge thereof is a bracket 27. On the opposite edge of the frame 23 is disposed a U-shaped bracket 28. The brackets 27 and 28 are provided with openings which act as bearings to receive a shaft 29. The shaft 29 extends from the bracket 27 on one side of the frame 23 to a point outside the housing 18.

Carried by the free end of the extension 26 is a handle 30 having an opening to receive the squared end of the shaft 29. Disposed on the end of the shaft 29 is a pointer 31 adapted to be moved to rotate the shaft 29 for the purpose hereinafter described.

When the frame 23 is moved into and out of the camera 6 the shaft 29 will be carried therewith. In order to prevent end play of the shaft 29 with relation to the frame 23 a spacer or collar 32 is disposed on the shaft 29 within the bracket 28. In assembling the device the bracket 28 may be made in two parts and secured together after the application of the spacer 32. In this way rotation of the shaft 29 is permitted but otherwise no relative movement is permitted between the shaft 29 and the frame 23. Carried by the handle 30 are stops 33 to limit the movement of the pointer 31 and thereby limit the rotation of the shaft 29.

Carried within the rectangular frame 23 is a screen holder 34. The screen holder 34 is slightly narrower than the inside width of the frame 23 so as to permit relative movement between the screen holder 34 and the frame 23. Secured to the sides of the screen holder 34 are brackets 35 having threaded openings to receive the shaft 29 which is threaded as shown at 36. Disposed in the screen holder 34 is a screen 37 held in place by lips 38 on the holder 34. One or more clips 39 are carried by the frame 23 and project past the edge of the screen holder 34 to maintain the holder 34 in proper position.

Secured to the frame 23 below the bracket 28 is a spring finger 40 adapted to operate into detents 41 on the collar 32 so that when the shaft 29 is rotated the finger 40 will enter a different detent 41, thus indicating when the desired movement of the shaft 29 has been made. Secured to the end wall of the housing 18 is a spring 42 adapted to bear against the extension 26 on the frame 23. The spring 42 acts as a brake to prevent unintentional movement of the extension 26 and the frame 23.

In the particular mechanism illustrated the screen 37 is adapted to permit of three exposures on a single piece of film. Where three exposures are desired instead of two the opaque lines on the screen 37 are made .010 of an inch in width with clear spaces of only .005 of an inch between them. When it is desired to make a composite picture the frame 23 and the screen 37 are placed in the position shown in Figure 1. An exposure is made in the usual manner by operating the release 9. The pointer 31 is then moved from the position shown in Figure 4 to a point midway between the stops 33. This partially rotates the shaft 29 and the collar or spacer 32. The spring finger 40 enters another detent 41 so as to insure that the shaft 29 has been rotated the desired degree.

Since the shaft 29 is incapable of movement with relation to the frame 23, the threaded portion 36 of the shaft 29 will move the brackets 35 and thus move the screen holder 34 and the screen 37 with relation to the film 11. The threads 36 on the shaft 29 are designed so that a partial rotation of the shaft 29 as described will move the screen 37 .005 of an inch. The previously exposed areas of the film 11 will then be covered by the opaque lines of the screen 37 and one-half of the previously covered areas of the film 11 will be exposed. Another exposure is then made and the pointer 31 is moved to abut the opposite stop 33. When this is done the screen 37 is again moved .005 of an inch so that the last unexposed one-third of the film 11 may be exposed. Since the opaque lines on the screen 37 are twice as wide as the clear areas between them it is not necessary to position the screen 37 in any particular position for the sequences of exposures. It is sufficient if one exposure is made with the pointer 31 in any one of the three positions. A second exposure is made with the pointer 31 in a different position and the final exposure made with the pointer 31 in the third position.

The exposed film 11 is then moved downward and the exposed portion cut off by the knife 16. This portion is then developed and a print made. The print is then mounted in a holder behind a screen having opaque lines similar to the screen 37.

When it is desired to use the camera 6 for making ordinary photographs the frame 23 together with the screen 37 is withdrawn from the camera 6 into the housing 18 by means of the handle 30. The camera 6 may then be used in the ordinary manner. When it is desired to make composite pictures the frame 23 is simply slid into the camera 6 in front of the film 11. Since the screen 37 is adjustable with relation to the frame 23 it is not necessary that the frame 23 be placed in the same exact positions each time that it is moved into the camera 6. It is only necesesary that the movement of the screen 37 with relation to the film 11 be very exact. As pointed out, this is accomplished by the partial rotation of the shaft 29. It will therefore be seen that a simple mechanism is provided which will permit precise adjustment of the screen 37 with relation to the film 11.

Having thus fully described the invention, what is claimed as new and desired to be secured by Letters Patent is:

1. In combination with a camera, a frame, a screen having alternate opaque and transparent areas disposed in the frame in front of a film, screw means to adjust the screen transversely in the frame with relation to the film so as to make a plurality of separate exposures on a single piece of film, a guideway in which the frame is movable and means to move the frame and screen on the guideway to one side of the film to permit the use of the camera for making ordinary exposures.

2. In combination with a camera, a frame, a screen having alternate opaque and transparent areas disposed in the frame in front of a film, screw means to adjust the screen transversely in the frame with relation to the film so as to make a plurality of separate exposures on a single piece of film, a frame housing secured to the camera into which the frame and screen are movable and a handle on the frame extending through the housing to move the frame and screen into the housing to permit the use of the camera for making ordinary exposures.

3. In combination with a camera, a frame, a screen having alternate opaque and transparent areas disposed in the frame in front of a film, screw means to adjust the screen transversely in the frame with relation to the film so as to make a plurality of separate exposures on a single piece of film, a support on which the frame is slidable, an extension on the camera having one wall in horizontal alignment with the frame support and a projecting member on the frame to permit manual sliding of the frame from its support to the extension so that the camera may be used for making ordinary exposures.

GARNET P. GRANT.